US006387278B1

(12) United States Patent
Leif et al.

(10) Patent No.: US 6,387,278 B1
(45) Date of Patent: May 14, 2002

(54) INCREASING SUBTERRANEAN MOBILIZATION OF ORGANIC CONTAMINANTS AND PETROLEUM BY AQUEOUS THERMAL OXIDATION

(75) Inventors: Roald N. Leif, San Francisco; Kevin G. Knauss, Livermore; Robin L. Newmark, Livermore; Roger D. Aines, Livermore; Craig Eaker, Alta Loma, all of CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 09/505,289

(22) Filed: Feb. 16, 2000

(51) Int. Cl.⁷ .................................................. C02F 1/72
(52) U.S. Cl. ...................... 210/747; 210/758; 210/763; 210/170; 210/908; 405/128.7; 405/128.75
(58) Field of Search ................................. 210/747, 758, 210/763, 170, 908; 405/128.7, 128.75

(56) References Cited

U.S. PATENT DOCUMENTS

| 1,238,355 A | 8/1917 | Squires |
| 1,651,311 A | 11/1927 | Atkinson |
| 1,787,972 A | 1/1931 | Doherty |
| 2,288,857 A | 7/1942 | Subkow ........................ 166/24 |
| 3,036,631 A | 5/1962 | Holbrook ........................ 166/9 |
| 3,823,776 A | 7/1974 | Holmes ........................ 166/261 |
| 3,938,590 A | 2/1976 | Redford et al. ............. 166/270 |
| 5,376,182 A | 12/1994 | Everett et al. ............. 134/25.1 |
| 5,772,888 A | 6/1998 | Liu et al. ..................... 210/634 |

FOREIGN PATENT DOCUMENTS

| GB | 696524 | 9/1953 |
| WO | WO94/21346 | 9/1994 |
| WO | WO97/05480 | 2/1997 |

Primary Examiner—Betsey Morrison Hoey
(74) Attorney, Agent, or Firm—Alan H. Thompson; L. E. Carnahan

(57) ABSTRACT

In situ hydrous pyrolysis/partial oxidation of organics at the site of the organics constrained in an subsurface reservoir produces surfactants that can form an oil/water emulsion that is effectively removed from an underground formation. The removal of the oil/water emulsions is particularly useful in several applications, e.g., soil contaminant remediation and enhanced oil recovery operations. A portion of the constrained organics react in heated reservoir water with injected steam containing dissolved oxygen gas at ambient reservoir conditions to produce such surfactants.

21 Claims, 7 Drawing Sheets

INCREASING SUBTERRANEAN MOBILIZATION OF ORGANIC CONTAMINANTS AND PETROLEUM BY AQUEOUS THERMAL OXIDATION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the removal of organics such as oils, including petroleum crude oil and products thereof, shale oils, oils from tar sands and the like, and organic contaminants, from underground accumulations of organics, such as natural subsurface formations and sites of hydrocarbon contamination. The invention is particularly useful for removal of residual organics, particularly constrained organics (those that can not be readily removed, e.g., residual organics) during enhanced oil recovery and soil remediation. The invention further relates to an in situ hydrous pyrolysis/oxidation process useful for partial in situ oxidation of the residual organics to generate surfactant molecules within subsurface water to enhance the mobility of the remaining bulk organic accumulations.

2. Description of Related Art

Subsurface formations that contain accumulations of organics, such as oils or contaminant hydrocarbons trapped therein, can be referred to as reservoirs. Removal of such organics from reservoirs by naturally occurring forces such as expanding high pressure gas and buoyant forces from encroaching water or gravity, is considered a primary recovery technique. Constrained organics are residual subsurface organic compounds retained in the subsurface after oil recovery or contaminant remediation techniques have been applied. These organics are normally in regions of relatively low permeability, or where such compounds remain tightly adsorbed onto surfaces of various mineral phases, or where moderate to low concentrations of the compounds remain behind as dissolved components in the groundwater phase. Such constrained organics are most often the difficult-to-remove residual compounds resulting from leakage or spills of organics, i.e., contaminant hydrocarbons or contaminants, or the difficult-to-produce naturally occurring oils, e.g., petroleum, shale oil, tar sands, bitumen, and the like.

In the former instance, underground fuel storage-tank leakage and industrial spills have posed a serious environmental problem. Fuel leaks contribute significantly to the contamination of groundwater by gasoline, aviation fuel, and other refined petroleum derivatives. Industry, such as electronic, chemical and chemical cleaning plants, are responsible for contamination of ground water with halogenated, typically chlorinated solvents. Many chlorinated hydrocarbons and components of fuels are of particular concern because they are confirmed or suspected carcinogens.

Many systems and methods have been developed to address the problems posed by such contaminated sites. Examples include systems for containment of the contaminants, pump-and-treat technology, methods for enhanced removal such as in situ dynamic underground stripping followed by ex situ treatments of contaminants, and methods for in situ treatments using various chemical and biological agents. Such systems or methods, however, do little for removing all contamination and cannot actually complete the remediation. The methods are unable to destroy or degrade the substantial residual amounts of hydrocarbon contaminants, i.e., constrained hydrocarbons, attached to the rocks, gravel, sand, clay or soil after the major decontamination efforts. A serious problem results because the remaining bulk phase organic contaminants continue to serve as slow release sources for sustained groundwater contamination. Capillary forces hold this free organic liquid tightly in the smaller pore spaces of the rock or soil, resulting in a "residual saturation" of organic liquid, i.e., that which cannot be removed by pumping. This can amount to up to 20% of the liquid present. Thermal remediation methods address this residual contaminant principally by attempting to volatilize it and transport it in the vapor form, a process which is not effective for high-boiling point organics.

Current methods offer only incomplete remediation essentially because much of the subsurface contamination is deeply embedded into soils through diffusion and sorption. When there is free organic liquid present, its release to the aqueous phase may also be limited by solubility. These sorts of limitations are known as mass-transfer limitations. Many of the cleanup methods mentioned above would work if not for these mass-transfer limitations. Thermal methods overcome these mass-transfer limitations by viscosity reduction, accelerating the rates of diffusion and sorption/desorption and by increasing the solubilities and volatilities of the contaminant compounds. Although other oxidative methods have been proposed utilizing permanganate salts, Fenton's reagent, ozone, or other oxidants, they too suffer from the mass-transfer limitations. In addition, they present problems stemming from the inability to mix the reagent with the contaminant in the subsurface.

Attempts to design permanent containment systems for underground contaminants are not practical as such systems need to be properly and continuously maintained and monitored for indefinite periods of time. These systems may hold the contaminants within the system, but they do not remove or degrade them. Consequently, when using this approach, the problem is never solved, but merely postponed. Any major natural disaster, such as an earthquake, may destroy these containment systems and the instant release of large amounts of constrained contaminant may be potentially extremely hazardous to the environment. Clearly, it would be advantageous to have a method available for the removal of these water and soil fuel hydrocarbon and chlorinated hydrocarbon contaminants which overcomes problems currently encountered with containment systems and in situ and ex situ treatments.

Several in situ methods for cleaning-up volatile organic compounds (VOC) involve the application of either heat alone or heat plus water and/or steam to mobilize volatile contaminants. This approach is essentially based on the physical properties of the VOCs. As the name implies, under appropriate conditions these contaminants volatilize. A good example of major efforts for fuel spill decontamination is a recently developed method for in situ dynamic underground stripping (DUS). The method, which is useful for removal of large amounts of volatile contaminants, is described in the Interim Progress Report, DOE publication UCRL-ID-109906 (1991), and in UCRL-1D-118187 (1994). During dynamic underground stripping, a targeted site is heated to vaporize the volatile contaminants. Once vaporized, the contaminants are removed from the spill site by vacuum extraction and treated ex situ. Dynamic underground stripping seems to be the best technique currently available to treat the large fuel spills. The lowest cost for treatment is associated with contaminant recovered as free-product liquid, due to its low total volume for handling. The dynamic underground stripping method alone is highly superior to conventional vacuum recovery. In combination with the current process of the invention, almost complete decontamination can be achieved in a very short time.

One of the major problems facing the remediation of volatile contaminants and solvents is the remaining low concentration of volatiles which, while volumetrically insignificant, can render water undrinkable. The difficulty in removing these residual contaminants (constrained organics), owing to the limitations posed by mass-transfer at low temperature, makes it nearly impossible to remove volatiles from most aquifers down to maximum contaminant levels of the drinking water standards. The cost of the process, and the time to accomplish it, are prohibitive and prevent remediation of low-level contamination using the mass-transfer limited methods.

Another trend in contaminant removal utilizes biological agents such as existing biota, bacteria, etc. For example, U.S. Pat. No. 5,279,740 describes a process for improved removal of contaminants from ground waters. The process utilizes simultaneous introduction of steam and specific nutrients effectively enhancing the growth of naturally occurring or added hydrocarbon degrading biota. The patent utilizes separate wells for adding the steam and nutrients and separate extraction wells for removal of extracted liquids and gas vapors containing the contaminants. As an ex situ method, it suffers from the problems enumerated above.

The solubility of organics in water tends to decrease as the total polarity of the organic decreases, making some of the most dangerous contaminant chemicals (e.g. trichloroethene, benzo(a)pyrene) essentially insoluble in water. Therefore they are very difficult to remove from contaminated soil by flushing with water, as in the pump-and-treat remediation methods. The use of thermal remediation methods, such as steam injection, can greatly increase the recovery of the more volatile organics but is still limited in the less soluble cases, such as the polycyclic aromatic hydrocarbons like benzo(a)pyrene.

One commonly used method of increasing the solubility of non-polar organics is to add surfactants, molecules that have polar groups and non-polar groups. This can effect direct co-solublization, where one end of the surfactant partitions into to the organic molecule(s) of interest, and the other partitions into the water, increasing the effective solubility of the organics. Often this mechanism is further enhanced by the formation of emulsions and spherical micelles, structures in which a hollow sphere of the surfactant molecules surrounds a core of the non-polar organic molecules. The polar end of the surfactant molecule points out of the sphere into the water, and the non-polar end points inward to the organic droplet. This principle is widely applied in creating cleaning agents, environmental cleanup processes, and enhanced oil recovery methods. In these applications surfactants are normally added to the system to create the micelles. In at least one instance, U.S. Pat. No. 3,036,631 describes an enhanced oil recovery method wherein organic acids, alcohols, ethers, aldehydes, ketones, etc., are produced below the surface and such compounds exhibit surface-tension-depressing properties. Mixed with injected caustic materials, as described in U.S. Pat. No. 2,288,857, such compounds produce emulsifying agents for petroleum oils.

The use of surfactants has met with limited success in the oil field and environmental remediation. Two difficulties arise; the chemical surfactants are expensive to produce, and it is difficult to get them into intimate contact with the organics, i.e., oil or contaminant molecules, underground. When these obstacles are overcome, the use of surfactants in both fields has greatly increased recovery. Surfactants are particularly effective at reducing the residual saturation of oil or organic liquid by reducing the surface tension between the water and oil. Torabzadeh and Handy, Society of Petroleum Engineers bulletin SPE 12689, 1984, show reductions from 32% to 25% in residual saturation of n-dodecane in Berea sandstone on addition of a common surfactant; upon increasing the temperature to 170 degrees C. the residual saturation was reduced to less than 3%. Because of the difficulty of simultaneously heating rock and mixing the surfactant with the oil, no huge benefit has been realized in oil production.

The present invention overcomes such difficulties by generating the surfactant in place (in situ), from the organic that is to be removed. The cost is much lower, injection of chemical is not required, the surfactant is created at exactly the location of the organic, and the surfactant is inherently well suited to mobilizing that product because it is derived from that product and has similar polarity and functional groups. Furthermore, in the case of utilization as a follow-on method subsequent to thermal treatment such as dynamic underground stripping, the new method takes advantage of the already existing injection-withdrawal wells and the persistently elevated underground temperatures for hydrous pyrolysis/partial oxidation affecting or enhancing the removal of constrained organics.

SUMMARY OF THE INVENTION

The present invention is a process for in situ hydrous pyrolysis/partial oxidation (HPPO) of constrained organics such as petroleum and petroleum products, including fuel hydrocarbons, polycyclic aromatic hydrocarbons, chlorinated hydrocarbons, and other volatile contaminants. The present process involves in situ partial oxidation of organics in water (normally liquid phase water such as groundwater and/or condensed steam) contained in subsurface soil or rock to produce intermediate oxygenated organic compounds, e.g., surfactants and precursors thereof, rather than completely oxidized compounds resulting from in situ hydrous pyrolysis/oxidation (HPO). In particular, the process involves thermal partial oxidation of organics including crude oils, petroleum products, including chlorinated or fuel hydrocarbons, petroleum distillates, polycyclic aromatic hydrocarbons, and other contaminants present in the soil and reservoir water, into oxygen-containing organic products of the oxidation, such as oxygen-containing functional groups (such as aldehyde, ketone, alcohol, or carboxylic acid functionalities) that are more soluble, but are also much more polar than the original forms, and therefore become surfactants. The process uses heat distributed through soils and water combined with oxygen or air or catalysts to produce the surfactants.

In this process, hydrous pyrolysis/partial oxidation is induced at an underground site containing subsurface constrained organics by introducing, under pressure, to the site either steam, oxygen (or air), a catalyst of the organic partial oxidation, or any combination thereof. The hydrous pyrolysis/partial oxidation proceeds, resulting in partial oxidation of the organics to the oxygen-containing functional groups that produce surfactants. The rate and degree of the partial oxidation is monitored to insure incomplete oxidation of the organics and the desired amount of surfactant formation.

The invention allows hydrous pyrolysis/partial oxidation of the aqueous mixture to produce surfactants that decrease the interfacial tension between the oil and water, and accordingly stabilizing oil-in-water emulsions. Subsequently, the oil/water emulsion can be removed from the underground formation.

Alternatively, the hydrous pyrolysis/partial oxidation of organics may be achieved by introduction of steam only to the groundwater (without addition of oxygen or a catalyst) and an oxidant of the target organics, where the oxidant is dissolved oxygen or air and/or a mineral present in the aquifer ground. The oxidant may include the dissolved oxygen already present in the water that contains the target organics, or mineral oxidants such as $MnO_2$ or $Fe_2O_3$, which are already present naturally in soils and rocks or may be added as oxidation catalysts.

The process may use already raised temperatures in the underground remaining after in situ dynamic underground stripping method, and introduce only oxygen or a catalyst effective for partial oxidation of organics. The heating of the ground may also be accomplished by electrical resistance (joule) heating, radio frequency or microwave heating, or other electrical heating means.

The present invention, hydrous pyrolysis/partial oxidation, has been demonstrated successfully to partially oxidize organic compounds such as naphthalene, creosote compounds (e.g., as contained in pole tar), ethylbenzene, and methyl-tertbutyl ether (MTBE). Stoichiometric amounts of dissolved oxygen in the groundwater will lead to complete oxidation of the compounds of the constrained organics; however, in the present invention, less than such stoichiometric amounts of dissolved oxygen to organics is necessary in the groundwater for partial oxidation of the organics (as required under the given concentration conditions of the reservoir). The compounds of the organics are rapidly (days to weeks) converted to surfactants as a result of such partial oxidation at temperatures from about 40° C.–350° C. Nevertheless, it may be unnecessary to add additional oxygen in cases where a stoichiometrically sufficient amount of oxygen is already present in the organic-containing groundwater to produce surfactants. At lower temperatures (e.g., 90° C.), partial oxidation proceeds at a slower rate and other, less completely oxidized compounds are included in the partially oxidized products effective as precursors for the desired surfactants.

The invention can be used to enhance the recovery of free organic liquids (non-aqueous phase liquids) during soil remediation processes, such as pump-and-treat remediation of contaminated ground water. The present method can apply to all organic contaminants susceptible to surfactant formation, and can be increasingly valuable with the less soluble contaminants such as coal tar, creosote, and manufactured gas plant waste. The present method has been effectively utilized to remove more than 500,000 lb of free-product of creosote from a creosote-contaminated subsurface site. Most of the recovered free-product creosote is in the form of the extremely stable oil/water emulsion formed by this method. The method can also assist the recovery of PCBs, pesticides, and other complex, low-solubility contaminants.

Recovery of heavy crude oil can be enhanced by the present method during steam flooding or other reservoir heating. Recovery of oil can occur as an oil-in-water emulsion . Enhanced recovery of oil by in situ surfactant formation can be enhanced from portions of a formation where retention is too great for oil to be produced by conventional steam flood applications, and can extend the productive life of an oil reservoir.

DETAILED DESCRIPTION OF THE INVENTION

Figure 1:
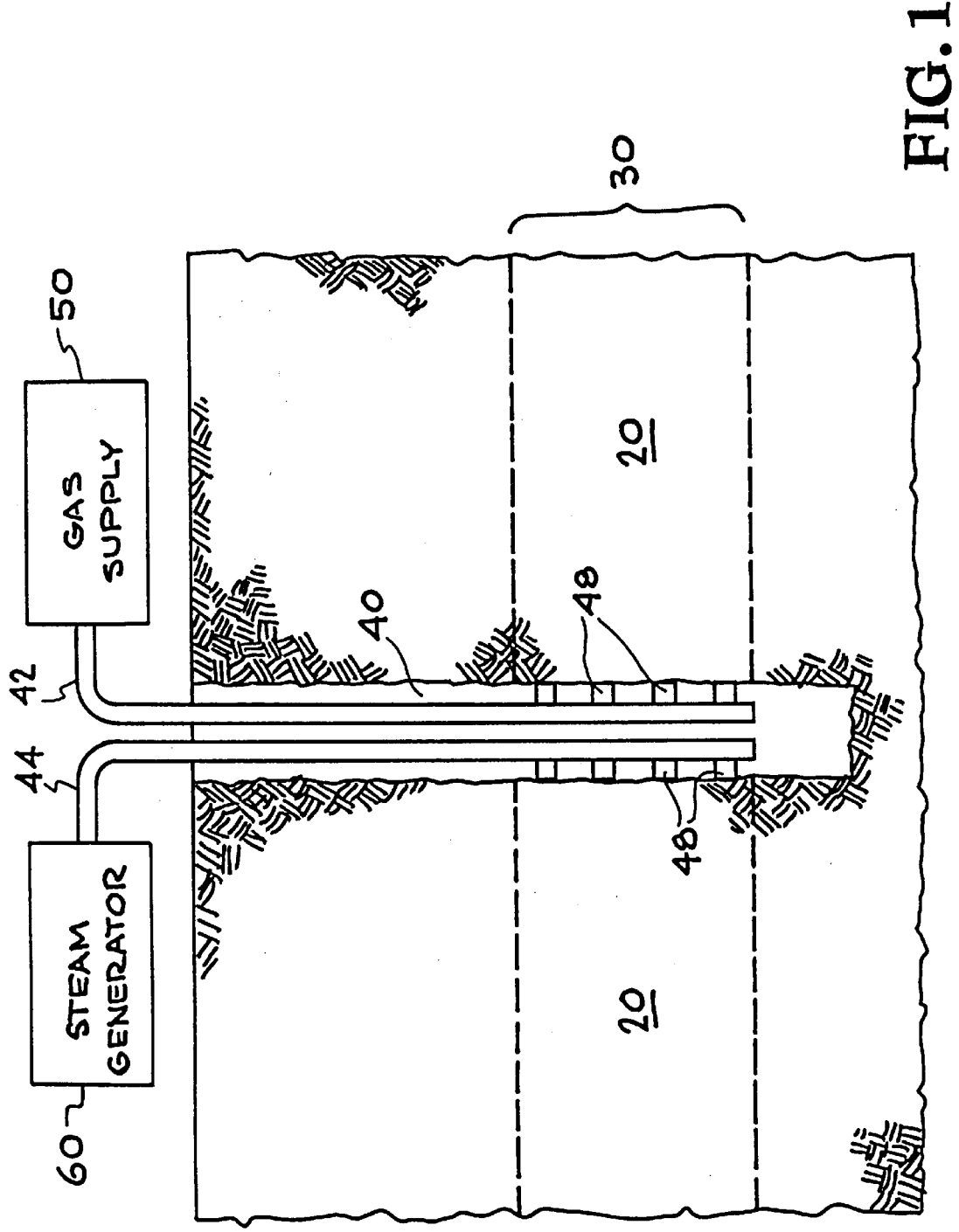
FIG. 1 is a schematic of field application of in situ hydrous pyrolysis/partial oxidation (HPPO) of the invention.

Definitions as Used Herein:

"Hydrocarbons" means hydrocarbons or halogenated, particularly chlorinated, organic solvents such as trichloroethane (TCA), trichloroethylene (TCE), perchloroethylene (PCE), dichloroethane (DCA) or dichloroethylene (DCE), etc. "Fuel hydrocarbons" means those hydrocarbons commonly found in gasoline, diesel fuel, aviation fuel, and the like.

"Contaminants" means all compounds falling within the term hydrocarbons and fuel hydrocarbons.

"Organics" means all carbon-containing compounds falling within the term contaminants, and oils including petroleum crude oils and petroleum products, bitumen, components from tar sands and shale oil.

"Constrained organics" means residual organics remaining in subsurface reservoirs after partial recovery and/or remediation of subsurface-located organics, and include organics tightly adsorbed onto surfaces of mineral phases and organics found in regions of low permeability, such as those held by capillary forces, and organics dissolved in subsurface water such as organic-containing groundwater and/or organic-containing steam condensate.

"DUS" means Dynamic Underground Stripping method as described in the Interim Progress Report, UCRL-ID-109906 (1991) and in UCRL-ID-118187 (1994) DOE publications.

General Description

In general, the process of the invention comprises in situ acceleration of organics recovery from the subsurface degradation via hydrous pyrolysis/partial oxidation reactions performed at elevated subsurface underground temperatures. The process uses mineral oxidants and/or oxidation catalysts and/or oxygen or air. Both oxygen and catalysts may be added or the process may utilize the endogenously present oxygen or oxidation agents (i.e., oxide minerals) as catalysts.

The invention is used to increase the mobilization of low-solubility organics in water by the in situ production of surfactants from subsurface sources of organics under a variety of circumstances. Key components are heat to increase the rate of oxidation and the presence of an oxidant in the aquifer (water). With increasing temperature, water becomes a progressively better solvent for organics. This occurs largely as a consequence of the precipitous drop in the dielectric constant of water as temperature increases. The oxygen source can be chosen from any compound with a net negative free energy of oxidation reaction with the organic being treated, such as hydrogen peroxide, permanganate, or ozone. Gases are usually easier to mix with the underground formation water, making them the preferred oxidant source. Ozone and peroxides of various kinds may be attractive in requiring a lower temperature to achieve the partial oxidation as well as surfactant and micelle formation in a given time. In any event, under appropriate conditions, as when the temperature of the underground is increased, oxidant-enriched water can be made to react with organics to produce a mixture of oxygenated organic compounds, i.e., precursors of surfactants or surfactants themselves.

The effective solubility of subsurface organics in ground water can be increased by partial oxidation of such organics, adding oxygen-containing functional groups (such as aldehyde, ketone, alcohol, or carboxylic acid functionalities). These amended molecules are more soluble, but are also much more polar than the original forms of organics contained in the underground formation, and therefore can serve as surfactants to stabilize oil-in-water emulsions. Thus, mobilization and subsequent recovery of organics is increased by formation of oil-in-water emulsions that are stabilized by the surfactants generated by the partial oxidation of a portion of the organics. The emulsions stabilized by these surfactants can mobilize original, unaltered molecules of organics in their center, while the oxygenated functional groups of the altered molecules face outward and readily dissolve in water. In this way, significant amounts of separate phase, originally undissolved organic-containing product can be mobilized in water and removed by standard pumping and treatment systems or systems with pump and treat combined with vacuum extraction. The approach is applicable to most common organics, such as oils, including crude oils, and other petroleum products, and contaminants such as polycyclic aromatic hydrocarbons (PAHs), fuels, lubricating oils, transformer oils including polychlorinated biphenyls (PCBs) and other organics which are not strongly soluble in water.

The hydrous pyrolysis/oxidation process (HPO), as described in U.S. Pat. No. 6,127,592, issued Oct. 3, 2000, and incorporated by reference herein in its entirety, has been employed as a complete in situ destruction mechanism to form benign products such as carbon dioxide. The desired and required partial oxidation of the organics in the present invention can be achieved via hydrous pyrolysis/partial oxidation (HPPO) in which intermediate oxidation products are formed that are clearly essentially more complex than the completely oxidized or completely degraded products of the HPO process. In cases where separate phase organic product is present, HPPO is an aid to removal of the product and as a final polishing step to completely remove residual organics, e.g., contaminants. The present HPPO process to partially oxidize separate phase organics for mobilization extends the applicability of HPO into cases where large amounts of free product must be removed from aquifers contaminated with organics, including fuels and oils, creosote, manufactured gas plant wastes, pesticides, and polychlorinated biphenyls (PCBs). This method may be used alone, or with the HPPO/Dynamic Underground Stripping method of removal. When used alone, small areas of product are selectively heated and oxidized so as to form (organic) free-product emulsions, which can be removed by conventional ground water treatment methods, but at a rate much larger than previously attainable. This method may also be used to enhance the recovery of petroleum during steam-based enhanced-oil-recovery processes.

In situ production of surfactant molecules is achieved by hydrous pyrolysis/partial oxidation of the existing organic molecules at the site of the residual, constrained organics. This may be accomplished by injection of steam and air or oxygen, injection of steam and other oxidizers such as hydrogen peroxide, electrical heating with air or oxygen injection, or other combinations of heating soil and amending existing water with oxygen or another oxidizer. Because it achieves rapid heating and very efficient mixing, injection of steam and oxygen is a preferred method. After initial injection, the steam may be allowed to condense in the formation, trapping the oxygen in the condensed water and promoting the oxidation reaction with adjacent organics. The reaction may also proceed while steam is present in the formation, through the transfer of oxygen and heat from the steam to residual water held by capillary forces in the formation. Even under conditions considerably above the applied boiling point at a given depth, capillary forces retain a large amount of liquid-phase water. The solubilized organics are removed by such methods as pumping the water containing the product out of the reservoir or formation.

Process temperatures and times can depend on the particular targeted organic constituent(s). Process times known for many organics must be predetermined by evaluation methods. In general, the process is normally operated at temperatures from about 80 C. to about 300 C., and preferably from about 100° to about 125° C. For example, creosote compounds can be processed in the invention at temperatures from about 80 C. to about 120 C. Oxygen limitation is important when product recovery is desired, so as to achieve maximum surfactant formation, while minimizing complete oxidation via hydrous pyrolysis/oxidation. Typical values for supplied oxygen are between 1 and 40 ppm in the accompanying aqueous phase, or on the order of 0.01 to 1% of the organic phase. Solubility of the supplied gas in the condensed steam is generally not exceeded for the temperature and pressure conditions in the reservoir at the water/oil emulsion formation site. Normally a predetermined amount of oxygen of more than 5 percent, and preferably more than 50 percent of oxygen gas water solubility can be provided with the water and constrained organics to achieve the desired amount of surfactant formation. Limiting the oxygen supply stops the oxidation reaction, producing the polar surfactant molecules.

In enhanced oil recovery, steam injection is commonly used to enhance the recovery of crude oil. Electrical heating is occasionally used. The present invention may be used with either method, but steam injection applications are preferred. In "steam soak" or "steam flood" operations, steam is injected into a well or pattern of wells (injection well(s)), and oil is recovered from separate (production) wells. Enhanced recovery occurs both as (1) a bank of oil that is pushed ahead of the steam toward the recovery well, and (2) as increased recovery (due to viscosity reduction) after the steam has penetrated the full distance between the wells. Large amounts of formation water are produced along with the oil, typically greater than 5 or 10 times more water than oil by volume. The present invention can aid the second phase of recovery, when oil is being produced along with formation water and the condensate from the injected steam.

In application of the present method of the invention, oxygen is added to the injected steam. Such injection(s)

provide(s) the oxygen to partially oxidize the oil during and preferably following condensation of the steam, thus causing surfactant formation which increases organic transport by emulsion formation. Steam provides a particularly effective delivery medium, avoiding the problems of distributing oxygen or other oxidant in the liquid phase. The required aqueous liquid phase is produced upon condensation of the steam. This process may be particularly effective for mobilizing constrained organics (,i.e., oil that is in parts of the formation where the permeability/capillary forces are such that oil does not readily move toward the extraction well). However, increased mobilization occurs at any point where surfactant-stabilized emulsions are formed. Increased recovery (and removal) at production wells can be as an oil/water emulsion.

The presence of, or formation of, a noncondensible gas phase in oil production can limit productivity by effectively plugging the formation or reservoir. Although any available noncondensible gas may be utilized, of interest in this case are nitrogen gas, which may be added as a component of air, and carbon dioxide gas, the product of complete oxidation of organics by HPO. Thus the amount of injected oxygen for surfactant formation must be limited to that required to partially oxidize the oil and remain in solution in the formation water. This will depend on temperature and pressure, but will in general be above about 50 or 100 parts per million by wt. (ppmw), increasing with increasing injection depth and pressure, but not sufficient for complete degradation of the oil. For oil recovery application, addition of oxygen is preferred over addition of air so as to minimize the noncondensible gas addition to the formation or reservoir. Oxygen may be safely added through coil tubing or other small diameter piping laid inside or along the main injection casing, and open at the injection interval. This minimizes contact of the highly corrosive oxygen/steam mixture particularly where mild steel is used in well casings.

The controlled nature of the HPPO reaction, the disseminated reaction occuring simultaneously throughout all the heated volume of rock or soil, and HPPO's natural limitation by the amount of dissolved oxygen in water, render this a much more effective means of creating oxidized groups on organics or oil than methods such as fire floods, in which oxygen or oxygen and steam are added to a "burn front" where a limited area of reaction receives much more oxygen than the minimum for surfactant formation, wasting oxygen and creating noncondensible gas. Because the reaction occurs in the gas phase in a fire flood, oxygen is rapidly transmitted to the burn front, decreasing the efficiency. The HPPO reaction of the invention does not begin in earnest until the steam in the formation condenses, limiting additional transport of oxygen and quenching any tendency for combustion by the presence of liquid water. The oxygen is used to maximum efficiency to create partially oxidized organic molecules.

In an application to environmental remediation, the present invention may be applied to both conventional pump-and-treat remediation of groundwater, and to applications of thermal remediation where heat is being applied to mobilize contaminants for recovery, volatilize contaminants for vacuum extraction, or destroy contaminants via hydrous pyrolysis/oxidation. When used with other thermal remediation methods intended to enhanced vacuum recovery (for example dynamic underground stripping (DUS); steam enhanced extraction (SEE); 6-phase electrical heating; hot water injection such as contained recovery of oily wastes (CROW); heating by conduction from heater wells; or microwave heating), or can be the principle method of recovery for contaminants such as creosote, transformer oils, and manufactured gas plant waste (PAHs, polycyclic aromatic hydrocarbons). This invention may be expected to be useful in remediating other low-solubility, non-volatile contaminants such as pesticide residues. Although these contaminants may be removed by thermal remediation combined with vacuum extraction or extensive water pumping, the HPPO-created emulsions of the present invention rapidly mobilize organic free product, achieving the most efficient removal and facilitating surface treatement by keeping the contaminant as concentrated as possible, and accordingly less mass can be treated.

In the remediation embodiment, the invention may be applied by mixing oxygen (or air) with the formation water or injected steam. Heat is supplied by any heating method, including those describe hereinafter. The formation water is pumped to recovery wells, causing it to pass through the heated, oxygenated zone or causing the heated, oxygenated water to pass over or through the contaminated soil region. This allows the partial oxidation reaction to occur. No gas phase or vacuum extraction is required; the reaction proceeds using oxygen dissolved in the water in the soil. When partial oxidation occurs, the contaminant is mobilized by surfactant-stabilized oil-in-water emulsions and pumped from recovery wells, such as conventional pump-and-treat-type recovery wells. The time for partial oxidation is typically slow, on the order of 1 or more days to 3 or 4 weeks. This time for oxidation sets the scale on which it is necessary to place injection and extraction wells; the spacing should be large enough to allow the oxygenated, hot water to maintain contact with contaminant or contaminated soil for the required reaction time. If the contact time exceeds the reaction time, there is no penalty in performance, since oxygen can be completely consumed and further reaction stops. The mobilized emulsions containing desired amounts of organic free-product continue to move through the formation until they reach the recovery well. The reduction in surface tension between water and organic effected by the surfactant molecules greatly facilitates this movement of micelles and emulsion droplets.

Application during steam injection is done according to the methods used for in situ oxygenation of organics via hydrous pyrolysis/partial oxidation. Air is added to the injected steam at about 25 to about 200 ppmw, up to the solubility limit (in condensed water) under environmental remediation conditions. The actual amount is preferably the solubility of air in the condensed steam in the formation, but environmental applications are not as sensitive to this parameter as enhanced oil recovery. Excess noncondensible gas in the formation is problematic if no vacuum recovery system is being used; in this case, the injection limits used in enhanced oil recovery can be utilized.

When used with an electrical heating method (either direct conduction heating or joule heating), the invention may be applied by adding air at the electrodes or upstream of the electrodes so that water that is heated by the electrodes also contains oxygen, and can then mobilize the organics by surfactant formation. Many electrical heating applications are intended only to vaporize contaminant. A water recovery well should be added to this type of application to remove the emulsified free-product contaminant. Because electrical heating methods typically have poor efficiency in permeable soils below the standing water table, application of this invention can enhance their range of application by improving the recovery of free-product from below the water table. For instance, an electrical heating element can be placed in a region suspected of harboring free-product contamination.

Air is injected at the heating element, while water and desired product can be pumped from either separate wells, or other electrical heating wells themselves. Air must be added to wells separate from those used for pumping.

Additionally, the process advantageously utilizes the conditions induced during the primary cleaning efforts of dynamic underground stripping (DUS) as well as the structures, such as wells, pumps, boilers, heaters, etc. Following DUS, due to the use of large amounts of added heat, the entire underground environment remains at elevated temperatures of 45°–80° C. for an extended period of time (at least 60 days) after the heat treatment following DUS.

There are several modes of achieving the partial organic chemical oxidation in situ. In the most preferred mode of the invention, the surfactant precursor formation is achieved by hydrous pyrolysis combined with an oxidation process where the steam and oxygen or air are both introduced into the contaminated underground, the underground is steam-heated to the required temperature optimal for the partial oxidation of particular organics, and the pressure build-up due to steam injection in the underground is optionally released. The steam, oxygen, and organic-containing water mix together and the partial chemical degradation by hydrous pyrolysis and partial oxidation of the organics proceeds to yield the oxygenated compounds such as carboxylic adds, alcohols, aldehydes, etc., which can serve as surfactants. The amount of organics and rate of organic removal are monitored using methods known in the art, including water surface tension monitors.

In another preferred mode, the steam and the hydrous pyrolysis/oxidation catalysts, such as manganese dioxide, or ferric oxide are introduced into the constrained organics zone underground. The choice of catalysts and temperature for optimal rate of oxidation depends on the particular organic. Organics removal is monitored as described above.

In still another mode, the steam is introduced alone without either the oxygen or air or catalyst. This mode is useful for a site where there is naturally present in the ground an oxidizing mineral, such as, for example, manganese dioxide or ferric oxide, or at a site where the dissolved oxygen naturally present in the water is sufficient to partially oxidize the organics present. In this instance, the temperature is increased, by steam introduction and/or by ohmic heating, to a temperature optimal for oxidation of the organics in the presence of the naturally occurring oxidizing agent. Organics removal is monitored as described above.

The last mode of practicing the invention is by introducing oxygen and/or an appropriate catalyst into the constrained organics zone following the dynamic underground stripping or other thermal remediation processes where the underground is already sufficiently warmed by the dynamic underground stripping. Typically, the temperatures between 45° C. and 80° C. remain in the underground for about two to three months or longer following dynamic underground stripping. The remaining high temperatures are utilized for in situ hydrous pyrolysis/partial oxidation. In one alternative of this last process, the temperatures are further raised to higher temperatures by introducing steam with oxygen and/or air and/or catalysts. In another alternative, no oxygen or air or catalysts are added, but the temperature is further raised by steam additions. The last mode of the invention complements the primary dynamic underground remediation stripping. Organic removal is monitored as described above.

This invention has been demonstrated to be applicable to a wide variety of organics, including low-soluble oils or products thereof as well as hydrocarbon and chlorinated hydrocarbon contaminants. Based on the range of classes of organic compounds already demonstrated to be amenable to hydrous pyrolysis/partial oxidation, this process is broadly applicable to any and all organic compounds, including substituted aliphatics, branched aliphatics, substituted aromatics, polyaromatics, oxygenated forms of all the preceding classes. For example, naphthalene and the oxidation scheme of reactions producing surfactant molecules therefrom, is set forth:

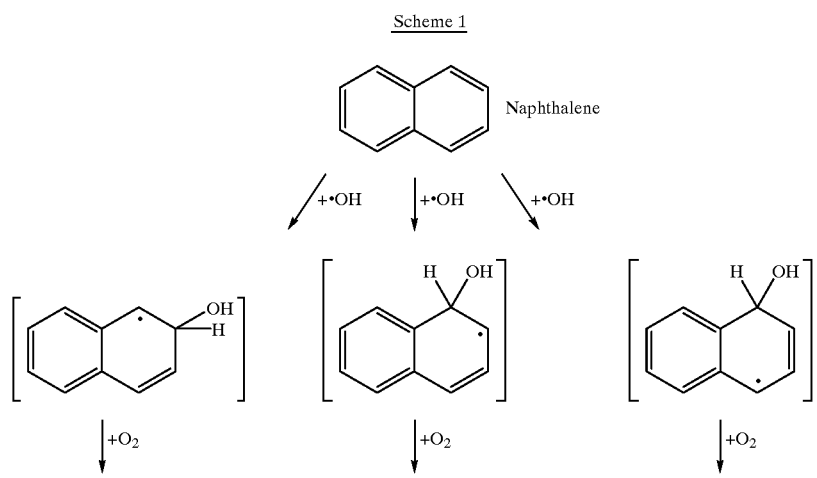

Scheme 1

-continued

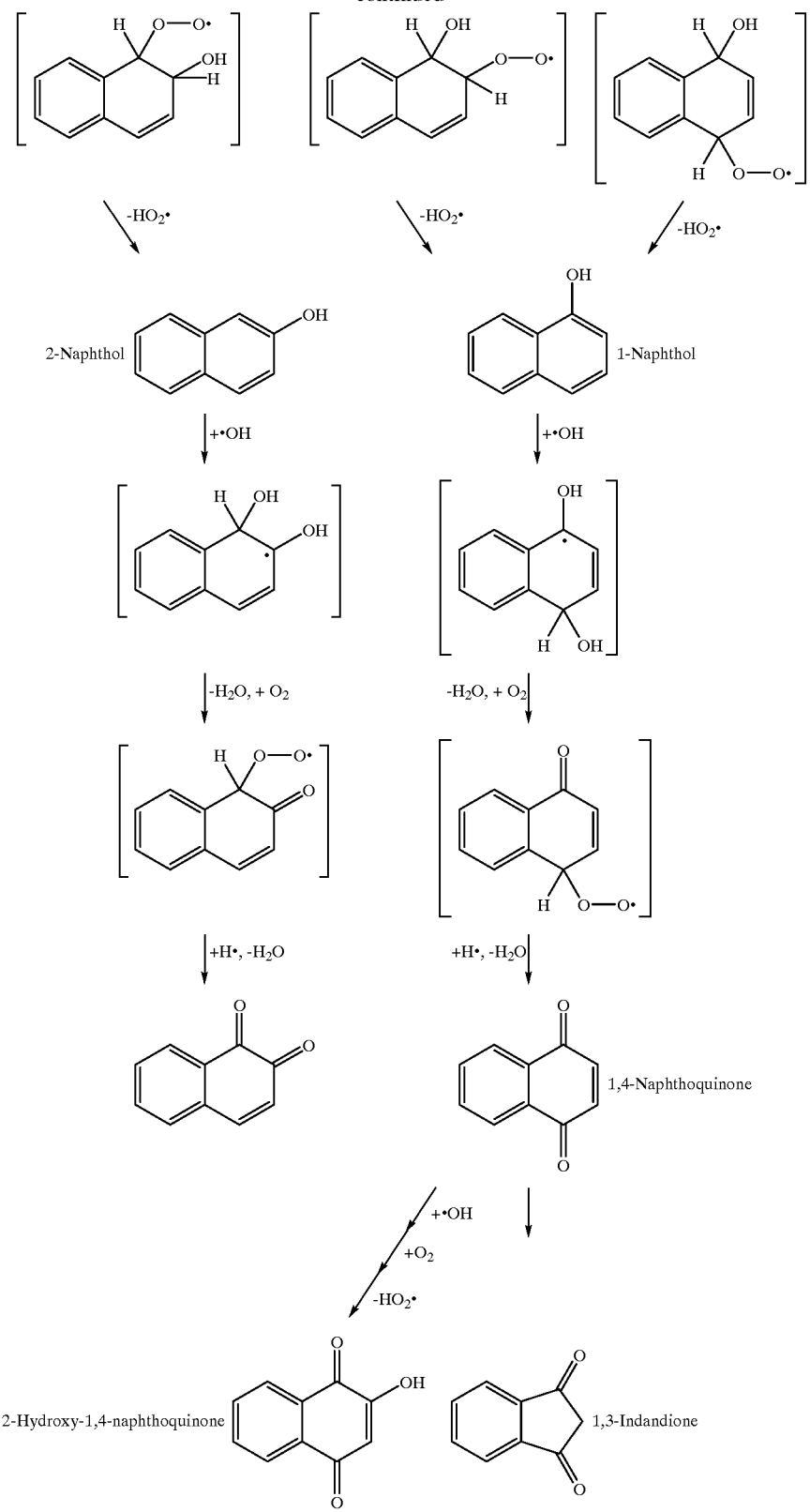

The oil/water emulsions containing the in situ-produced surfactants can be removed from the subsurface site of formation of the oil/water emulsion by known techniques in the oil recovery and/or remediation fields. Such oil/water emulsions can be separated into desired components, preferably at or near the surface. The amount of in situ-produced surfactants can be detected by any known techniques, including oil/water interfacial tension measurements, e.g., recovery at the surface of oil/water emulsion products of lower interfacial tension than recovered oil/water emulsion products containing no in situ-generated surfactant.

A field application of in situ hydrous pyrolysis/partial oxidation process is illustrated in FIG. 1. FIG. 1 shows the aquifer (reservoir) 20 containing site 30 having constrained organics. FIG. 1 illustrates a system for the partial oxidation to surfactants where only one well 40 is used. In system variations, two or more wells may be utilized. Generally, the number of wells will depend on the size of the reservoir of the organics. Through well 40, two pipes 42 and 44, preferably made of stainless steel, are introduced into the underground water reservoir 20, preferably to the site of constrained organics 30.

In FIG. 1, the well is placed approximately in the middle of the contaminated site 30. Oxygen is supplied through pipe 42 from the gas tanker 50 or from any other gas storage place or distribution system (i.e., from a compressor). Typically, the oxygen pipe is straight or preferably it branches into ducts 48 so that oxygen is distributed to various depths of the contaminated site and there it is mixed with steam having predetermined temperature optimal for partial oxidation of the particular organic. Air may be substituted for oxygen when the presence of nitrogen in the air will not be deleterious. In general air will suffice for all but the most highly organic concentrated sites, where the build-up of nitrogen gas bubbles in the subsurface may impede injection of steam through permeability reduction. Steam temperature is such that it suffices to warm the underground to temperatures typically above 75° C., preferably between 100° C. to about 125° C. The degree to which the underground is warmed depends on the organic as well as on the degree of concentration.

Steam is introduced to the site of contamination through the pipe 44 under pressure from a pump, compressor or a boiler 60. The pipe 44 may be straight or branched as seen for oxygen pipe. When the steam is introduced into the underground reservoir 30, there is a pressure build-up. The higher pressure forces the steam/oxygen mixture into the gravel, sand and rock cracks, crevices and spaces, and thus promotes greater partial oxidation of organics. Using the same pipe 44 in reverse, or a separate pipe, certain amounts of water may be optionally pumped out to relieve the pressure, using the reverse pumping or vacuum. In such an instance, the removed water is submitted to ex situ organic removal. However, it is only a small portion of the contaminated water, if at all, which needs to be removed and therefore the ex situ clean-up is not extensive. Steam is introduced via tube 44, which typically has a higher diameter and is also preferably made of steel as both steam and oxygen are corrosive agents.

Oxygen and steam are separately introduced to the site of constrained organics. In the mixture, these agents are very corrosive. Steam is introduced preferably in successive steam pulses. These steam pulses expand the heated zone through the site of constrained organics. Ground water returns between steam pulses and flows through the hot, oxygenated region partially oxidizing organics and allowing the surfactant or surfactant precursor products to form oil/water emulsions with remaining portions of the constrained organics, e.g., the non-oxidized or insufficiently oxidized constrained organics that encompass a majority of the remaining constrained organics of the reservoir.

In this respect, and in contrast to the HPO process, the heating methods according to the invention need not be extremely robust. Since the constrained organics are only partially oxidized in place and the resultant oil/water emulsions have to be transported back out of the reservoir or formation, the overall process of the invention further contrasts the HPO process by enabling removal of the constrained organics by the partial oxidation products.

The system and the process of the invention can, however, be supplementary to a primary decontamination effort, such as dynamic underground stripping. As discussed above, dynamic underground stripping provides a method for fast removal of large amounts of contaminant organics using hot underground temperatures. Underground stripping, however, does not necessarily completely remove all residual contaminants. At this stage, the current invention takes over and partially oxidizes, via hydrous pyrolysis/ oxidation, a first portion of the residual contaminants to surfactants, and subsequently, the remaining residual contaminants are emulsified with water and the in situ produced surfactant(s), and removed via the same apparatus utilized for the underground stripping. In this way, the dynamic underground stripping combined with in situ pyrolysis provide a highly advantageous decontamination process for organic contamination.

The dynamic underground stripping method alone is highly superior to conventional vacuum recovery. In combination with the current process, almost complete decontamination can be achieved in a very short time. The superiority of Dynamic Underground Stripping over conventional methods is illustrated in FIG. 2.

Figure 2:
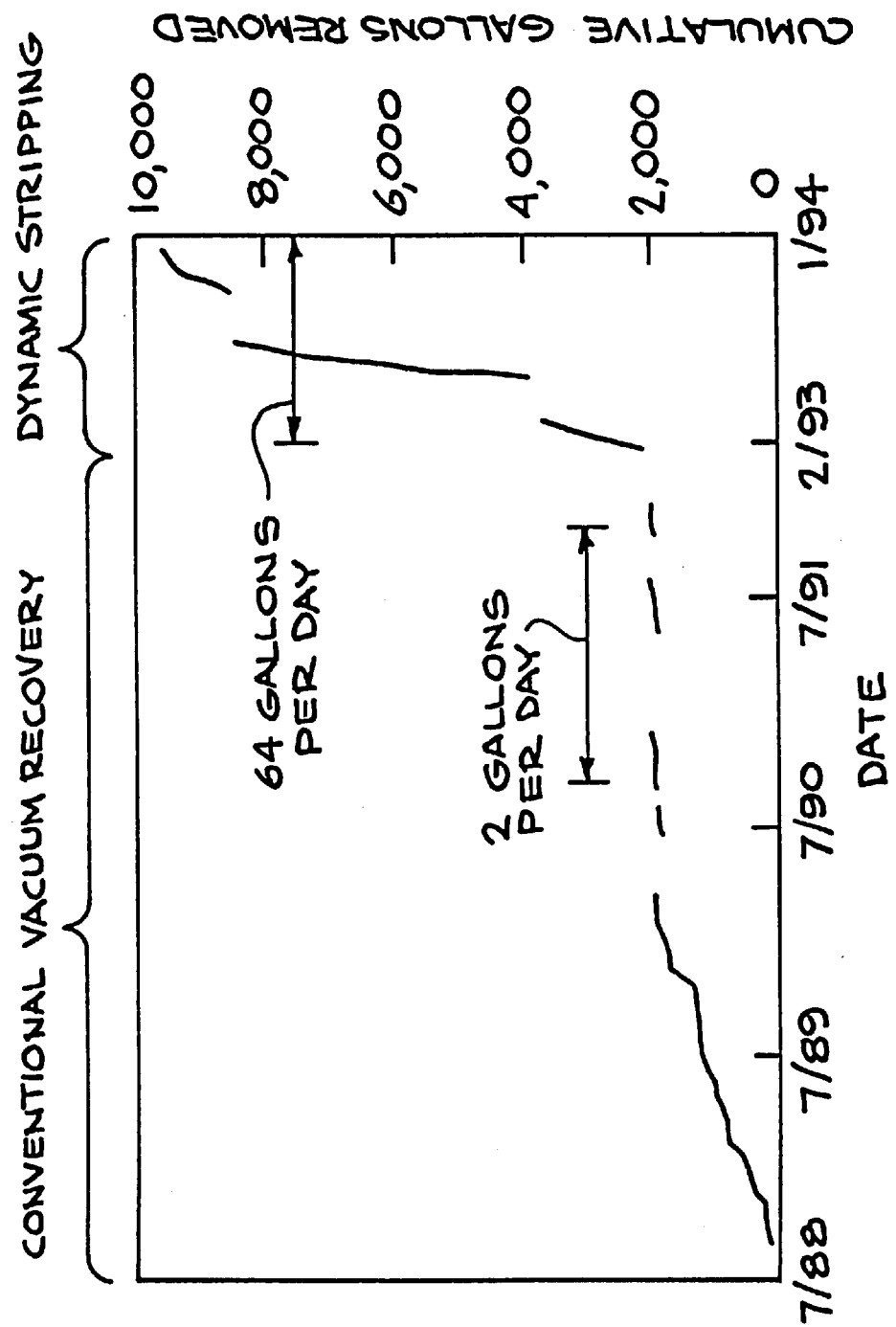
FIG. 2 is comparison of Dynamic Underground Stripping with conventional methods for removal of gasoline.

FIG. 2 illustrates results of gasoline removal during the dynamic underground stripping as compared to gasoline removal by conventional methods at the same site. This comparative study shows that large-scale heating and monitoring can be conducted safely and effectively and that large, stable steam zones can be constructed and maintained below the water table. As seen in FIG. 2, vapor recovery was extremely efficient from these zones, and where the conventional vacuum recovery pump and treat was able to remove 2.5 gallons of vapor per day, dynamic underground stripping method removed about 64 gallons of vapor per day averaged over a year.

Figure 3:
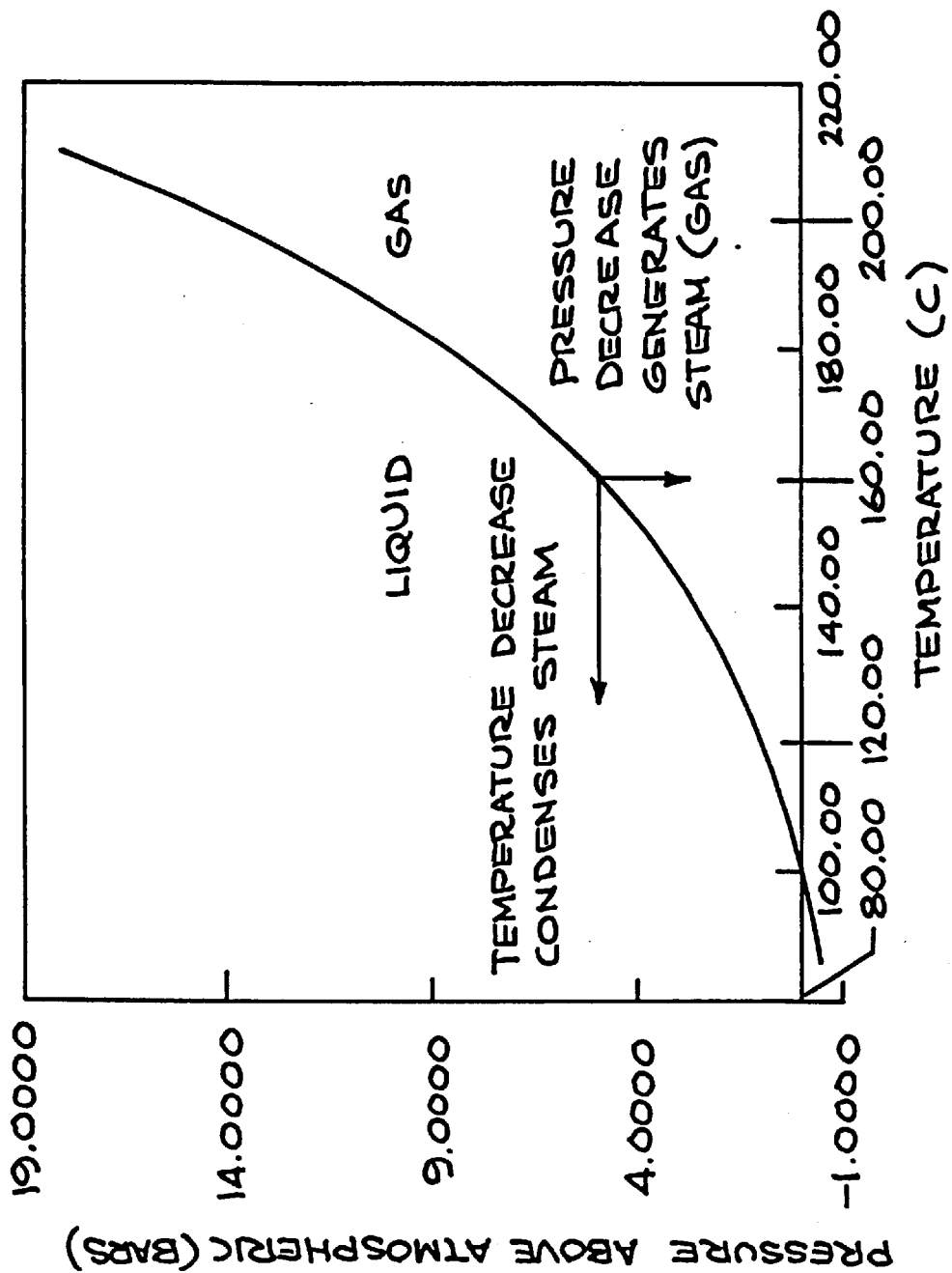
FIG. 3 shows the boiling curve of water in constrained temperature and pressure conditions where both liquid water and steam coexist.
Figure 4:
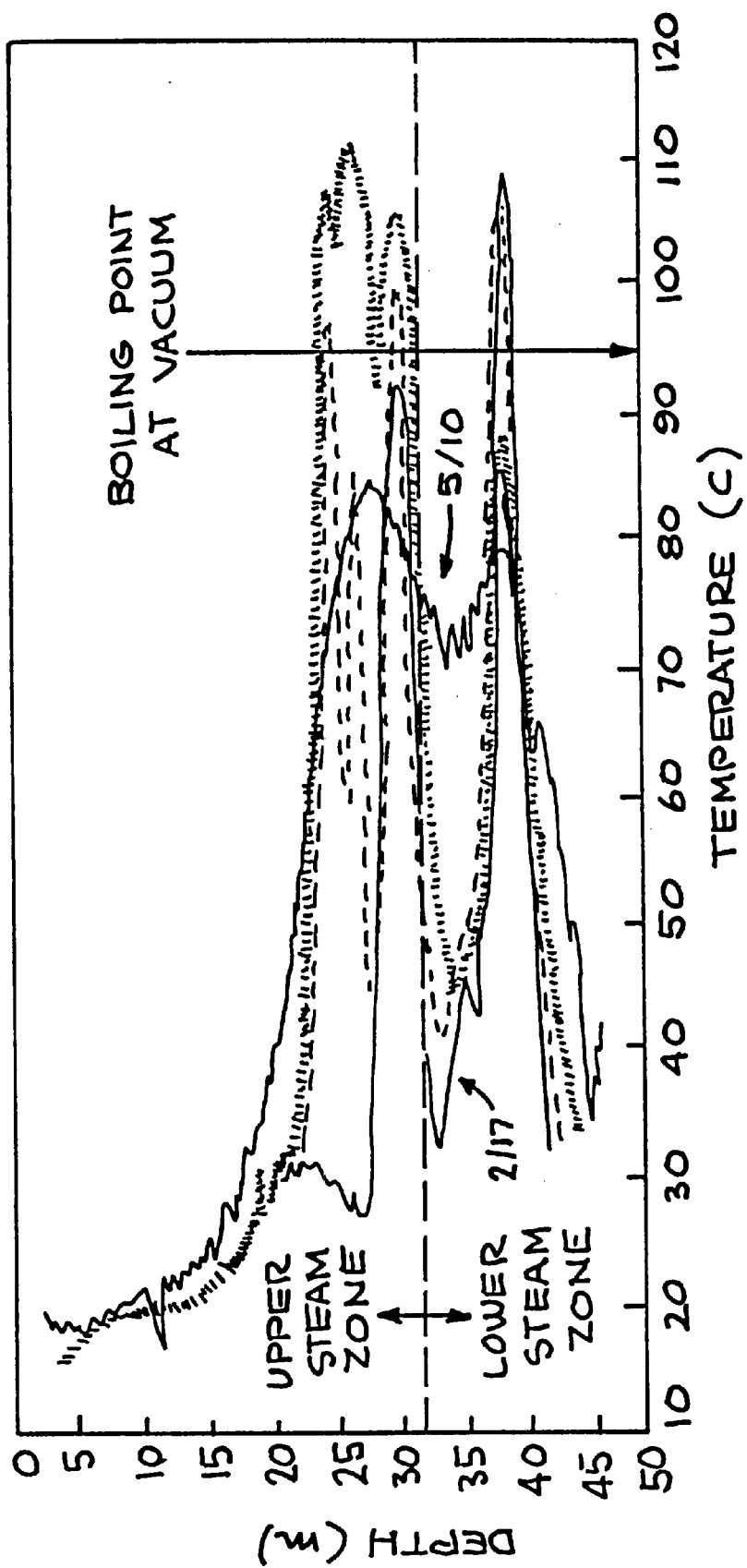
FIG. 4 illustrates growth of heated zones in the gasoline spill site test of Dynamic Underground Stripping.

In the current process, as seen in FIG. 1, it has been determined that the steam zone grows perpendicularly as well as parallel to steam drive. Parallel steam growth can cause displacement. Complete displacement of organics does not happen prior to surfactant formation and oil/water emulsion formation during the hydrous pyrolysis/partial oxidation process of the invention, as seen in FIGS. 3 and 4. Conversely, once the surfactants are created in place (i.e., in situ) the organic may be displaced with greater efficiency.

In normal hydraulic displacement, such as the injection of fluids, a piston-type flow typically occurs where the contaminated groundwater is pushed away by the injected fluids. In the piston case, the mixing zone is a thin shell where the two fluids come in contact. Dispersion is thought to be minimal. In the case of steam injection, the steam front expands, and the mixing zone is expected to lie in a similar thin shell where the steam, steam condensate and contaminated water are moving. When the steam is permitted to collapse to the liquid phase, the contaminated water flows back through a zone in which steam condensate (making up a relatively small portion of the volume) mixes with the steam, and is exposed to the gases that have permeated the steam zone. This creates a large mixing volume, unlike the piston-flow analogy. In addition, it has been found that the movement of steam in natural systems rarely forms a large, continuous front, but instead progresses as a zone of many tiny steam "fingers," which increases the mixing surface available for initial interaction during the steam push. These two factors combine to greatly increase the level of mixing achieved during a steam delivery of oxidant, on a physical basis, in the HPPO method. The surfactant begins to develop as soon as these fluids interact, so the surfactant is being created along the growing leading edge of the steam front as well as later, during the steam collapse, when a large reaction zone is formed.

FIG. 3 shows the boiling curve of water under constrained temperature and pressure where both liquid water and steam coexist. The effect of reducing the applied pressure on a heated zone is to generate vapor (steam). The effect of cooling a heated region is to create a vacuum as water condenses. FIG. 4 illustrates growth of heated zones in the gasoline spill site test of Dynamic Underground Stripping. FIG. 4 shows temperature logs from one well located near the center of the pattern. During injection, temperatures exceed 100° C. as the zone pressurizes. Adjacent silty layers heat by conduction and water is expelled from these zone by boiling. Oxygen-rich steam is able to occupy these areas, and condense to oxygenated water when steam pressure is released. FIG. 4 further shows lower steam zone collapse and reformation over five months of operation and the distribution of steam throughout various depth zones of wells and its dependence on the underground temperature.

As illustrated in FIGS. 3 and 4, the initial displacement of ground water in gas pad tests occurred in a fairly narrow zone, about two meters thick. This is the zone in which classical piston displacement should be expected to occur, and it would be hard to get enough injected oxygen into this zone by itself. However, the zone continued to grow in the vertical perpendicular direction as can be seen in FIG. 1, by conduction and convection of heat. Only small-scale fluid displacements were observed. The thicker portions of the steam zone were difficult to re-flood on the return of the ground water. Oxygenated steam introduced according to the invention is cooler and would preferentially condense there. This steam thus has no rapid flow path and would not be removed because flow is perpendicular to the main aquifer.

When the detailed logs are examined from the formation and collapse of steam zones at the gas pad demonstration, the extent of the overheating can be clearly seen in FIG. 4. When the formation temperature exceeds the boiling point of water at the applied pressure (FIG. 4, vertical line), the extra heat stored in the formation must be dissipated in steam formation. In these peripheral zones, as the temperature cools and more steam is converted to liquid water, a mild vacuum ensues and pulls water into the zone to reflood it. This water comes from the aquifer, which has re-flooded with the original contaminated fluid.

Alternatively, if the applied pressure on the formation is atmospheric and the applied pressure on the steam zone represents the boiling point of water at the temperature achieved, then when steam injection is halted the formation or reservoir behaves like the cylinder in a steam engine. As heat is lost to the formation from the steam zone, steam condenses and a vacuum occurs, drawing water in from the surrounding formation just as the condensation in a steam engine draws in the piston.

Fluid displacement of water in the permeable parts of the aquifer, as described above, allows removal of a certain percentage of the organics. Due to dispersion, however, most of the organics appears to be in the peripheral zones which are still somewhat permeable but which have more surface area.

The current process can be advantageously coupled to the other treatment methods as already described above. The process is particularly cost effective when it is used as a follow-up on the primary cleaning using dynamic underground stripping. Additionally, the process can be combined with a biofilter built-in downstream. In this application the hydrous pyrolysis/oxidation process provides an active drive mechanism forcing water through the biofilter as described in Example 1.

The process can be also advantageously combined with a pump and treat process. Warming the water will reduce sorption, increase diffusion, reduce viscosity, and in general increase the effectiveness of pump and treat operations. Pump and treat screens can be very effective at controlling the flow of organics downstream from a thermal operation. If there are other organics that are not partially oxidized in situ pump and treat (water or vacuum extraction) can be used to extract the organic in huff and puff mode. The efficiency of such a combination is very high. Extracted hot water can be airstripped before cooling, which is both an effective cleaning and cooling method.

The current process can also be modified for use in small spills or leaks, such as for treatment of cleaning stored waste water or for small industrial leaks. In this case, instead of introducing steam, in situ temperature can be advantageously raised by other thermal means such as electric heating. Slow electrical heating of the soil or water, over a period of several days to 3 months, will allow partial oxidation in place, if enough oxygen is present. This application may be most advantageous in soils with very low permeability.

The extremely corrosive nature of mixtures of steam and oxygen or air is well known. This process takes advantage of the general resistance of soils to oxidative corrosion, since most soils have formed by long contact with air and oxygen. Thus soils and rocks may be expected to provide an appropriate containment vessel for the hydrous pyrolysis/partial oxidation reaction, which could not be accomplished on the surface in normal industrial materials such as steel which would rapidly corrode under these conditions.

Experimental Laboratory Testing

The process for this invention is successfully developed and tested in laboratory experimental settings. Various organics, various temperatures, pressures, presence or absence of oxygen and presence or absence of mineral oxidants are tested before the field decontamination treatment is designed.

For this purpose, laboratory static autoclave experiments are used to determine the optimum chemical conditions for remediating contaminants via hydrous pyrolysis/oxidation. The initial phase of this experimental work is used as a vehicle for designing an in situ thermal remediation technique applicable to fuel hydrocarbons, halogenated hydrocarbons, creosotes and other contaminants. The field treatment process in the laboratory is simulated to measure the impact of treatment on soil transport properties and fluid chemistry, and to identify the organic/aqueous fluid-solid reactions that occur.

The static autoclave experiments are run in Dickson-type, gold-bag rocking autoclaves. The autoclave reaction vessel uses a flexible gold bag sealed with a passivated titanium head and is contained within a large steel pressure vessel. The autoclave design allows periodic sampling of the reaction cell under in situ conditions throughout the course of an experiment without disturbing the temperature and pressure of the run. During the experiment the solution contacts only gold and passivated titanium so that unwanted surface catalytic effects are eliminated. Various combinations of solid, liquid or gaseous catalysts or oxidants are introduced into the reactor in order to study their effects on reaction mechanisms and rates. The sampled fluids and gases are analyzed using a variety of analytical techniques including ICP-ES, IC, GC (using purge and trap), gas MS, GC/MS, and HPLC.

All experiments are conducted in non-reactive flexible gold bag hydrothermal systems, so that complications due to experimental artifacts from catalysis by the equipment itself are avoided, and both temperature and pressure can be precisely controlled. Many samples can be taken and tested as the reaction proceeds without affecting the conditions of the reaction itself. This allows detection of the exact reaction mechanisms, which involve the production of H+ ion, carbon dioxide, and free chloride anion of the HPO process, and oxygenated organic products, including surfactants and precursors thereof, of the HPPO process.

Thus data is made available on the elevated temperature thermodynamic properties of the organics. The static autoclaves are, therefore, also used in the determination of liquid phase solubility for organics and particular compounds thereof, which are needed and useful for determination of the optimal conditions for HPO of various organics, and more importantly, the conditions for HPPO, which require the formation of less-than degraded organics.

In practice, before the HPO and HPPO processes are used for any organic, its theoretical basis is calculated as seen above, followed by laboratory testing as seen above. After these conditions are determined, a field determination is instituted, such as that in Example 1.

In situ Hydrous Pyrolysis/Oxidation of Trichloroethylene and Other Organics in a Laboratory Setting During actual experimental testing of hydrocarbon degradation and partial oxidation, the first chlorinated hydrocarbon tested was trichloroetheane (TCE). Other tested contaminants included: perchloroethene, naphthalene, pentachlorophenol, creosote compounds (e.g., as contained in pole tar), ethylbenzene, MTBE, and machining/cutting fluids (e.g., RapidTap % and Alumicut %).

A Dickson-type autoclave, as described above, equipped with a precision high pressure liquid chromatography pump to control pressure was used to measure the solubility of TCE in water as a function of temperature from 298 to 398 K at constant pressure. Obtained results were used to calculate the partial molal thermodynamic quantities for the dissolution reaction of TCE in water at 298 K: $\Delta G_{soln}$=11.1 (±0.71) KJ/mol, $\Delta H_{soln}$=3.075 (±0.525) KJ/mol and $\Delta S_{soln}$=−28.29 (±1.61) J/mol-K.

Using the same experimental set-up, the hydrous pyrolysis/oxidation of TCE dissolved in pure water containing various concentrations of dissolved oxygen or solid manganese dioxide at temperatures varying from 50° C. to 150° C. was studied. In the initial experiments, very high concentrations of TCE (up to ≧600 ppm) and dissolved oxygen (typically up to several hundred ppm) were used. These TCE concentrations were much higher than those found at most typical contaminated sites. These high concentrations were selected in order to determine that the current approach would be feasible for the hydrous pyrolysis/oxidation process in the worst possible situations. In addition, by starting with high concentrations of TCE, the presence of possible deleterious products could be more easily observed.

Dissolved oxygen was found to rapidly and completely degrade TCE to benign products, predominantly to carbon dioxide and chloride anion at temperatures easily achieved in in situ conditions of thermal remediation techniques. At temperatures above 90° C., the TCE was completely degraded to minimal detection limits in from one to a few days to several weeks, depending on the temperature. The TCE concentration in the initial runs with high starting concentrations decreased as much as 10,000-fold, eventually reaching the drinking water MCL (5 ppb). The TCE degradation products were hydrogen ions, free chloride anions and $CO_2$ as expected for complete oxidation (mineralization) of the chlorinated hydrocarbon.

In another set of runs with high initial dissolved oxygen concentration, ethylbenzene and MTBE were subjected to hydrous pyrolysis/oxidation at 100° C. and 125° C. These compounds were also converted largely to $CO_2$. Other products included slightly less oxidized compounds, i.e., alcohols. Such alcohols can be converted to surfactants and employed to form oil/water emulsions that can be transported back to the surface. No deleterious compounds were produced in the hydrous pyrolysis/oxidation of ethylbenzene or MTBE.

Figure 5:
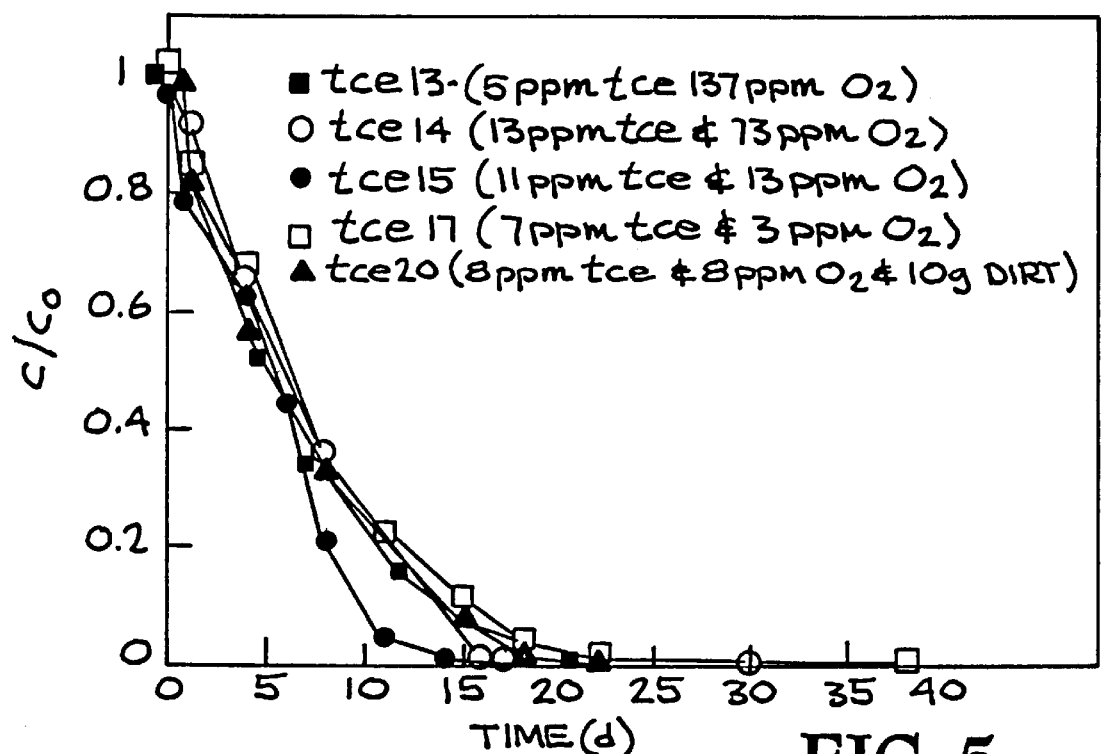
FIG. 5 shows the oxidation of dissolved TCE with dissolved oxygen and the oxidation of TCE in the presence of rock/soil from drillcore.

Subsequent studies were designed to measure the impact of oxygen concentration on the rate of TCE destruction. As seen in FIG. 5, a series of runs were conducted all with nominally the same starting TCE concentration (~9 ppm), and all conducted at the same temperature (~100° C.) but with varying dissolved oxygen concentrations ranging from 137 ppm to 3 ppm. In all runs, the dissolved oxygen starting concentration is equal to or greater than the stoichiometric amount required to completely mineralize the TCE. As can be seen, the rates of reaction are independent of dissolved oxygen at this temperature, as long as sufficient dissolved oxygen is present. These results clearly suggest that, depending on the initial TCE and dissolved oxygen concentration in the contaminated zone, it may be possible to conduct hydrous pyrolysis/oxidation or to conduct hydrous pyrolysis/partial oxidation to form surfactants without any added air or oxygen, or it may be sufficient to use air alone as the oxidant, or it may be required to use oxygen gas.

Also included in FIG. 5 are the results of a run comparable in initial TCE and dissolved oxygen concentration to the others in this series, but with aquifer rock/soil ("dirt") added. This was done to assess the impact of minerals on TCE destruction, oxygen consumption, solution composition, etc. Clearly, under the conditions of this run, the results were indistinguishable from the runs conducted in the absence of aquifer minerals.

The acid produced during hydrous pyrolysis/oxidation is rapidly consumed by the feldspar minerals present in aquifer rocks and soils and the ground water does not become appreciably acidic in the field. This is clearly seen in comparing the soil containing run to the other runs, which contained no soil minerals. The soil containing run maintained a relatively constant pH, because the H+ produced during hydrous pyrolysis/oxidation of TCE was removed from solution by ion exchange processes on the surface minerals present. This same effect would be seen in the subsurface during a remediation effort.

A similar set of experiments was conducted to investigate the impact of varying dissolved oxygen concentration on the hydrous pyrolysis/oxidation of naphthalene and PCP. These runs were made at 100° C. and 125° C. It was again observed that hydrous pyrolysis/oxidation proceeded at a rapid rate, as long as at least a stoichiometrically sufficient amount of dissolved oxygen were present. The naphthalene runs showed that although this compound is more stable towards oxidation that the aliphatic or aromatic chlorinated hydrocarbons, it also oxidizes rapidly enough at 125° C. to be amenable to remediation using hydrous pyrolysis/ oxidation. Thus, at a predetermined temperature, such as at less than 125 degrees C., naphthalene can be partially oxidized to surfactant precursor compounds or surfactants to enhance oil/water emulsion formation.

Figure 6:
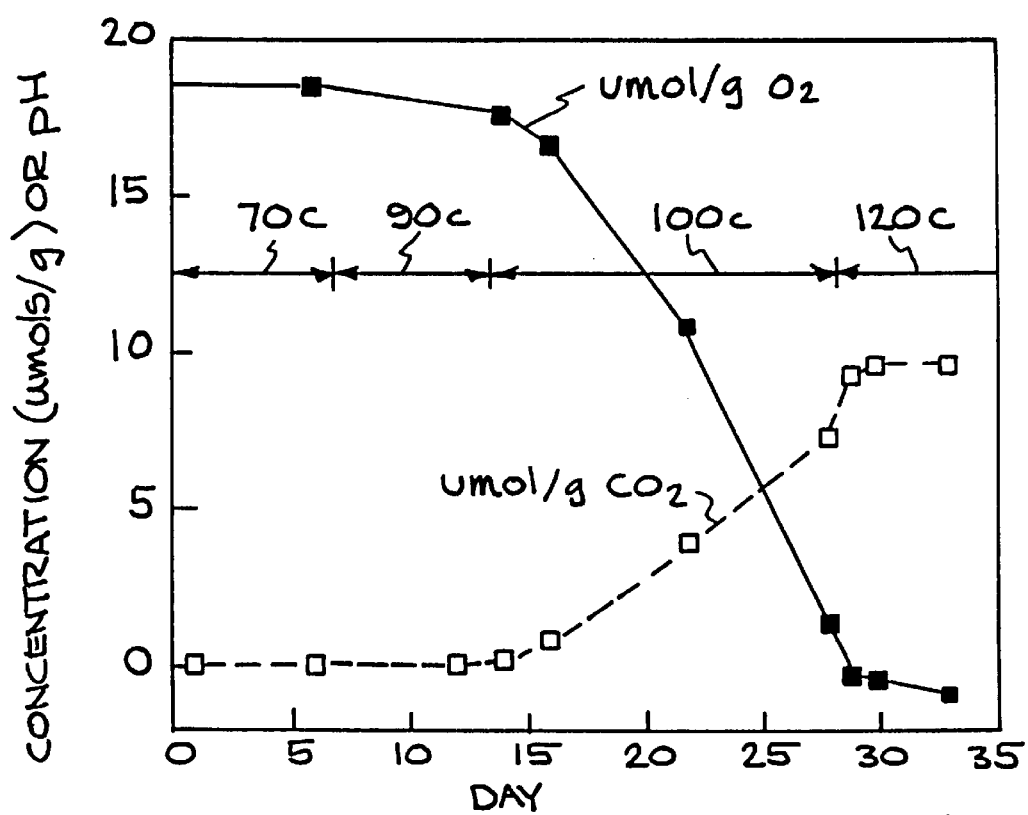
FIG. 6 shows the oxidation of complex pole-tar components such as polycylic aromatic hydrocarbons (PAH).

In a test of the applicability of this method to the remediation of real, complex mixtures of hydrocarbons, a test was conducted using pole-treating residue from a site in Southern California. At this site, creosotes, petroleum products, and pentachlorophenol were used. A separate organic liquid composed mainly of creosotes and other petroleum-compounds can be recovered from beneath the water table at the site. This free organic liquid was used in testing. Two tests were conducted on this complex mixture (Table 1). Analytical results were obtained only for the polycyclic aromatic hydrocarbons, which are the chemicals of regulatory concern. Other petroleum compounds were not analyzed; in general they are similar to diesel fuel. The "Equilibrated Water" was stirred with an excess of the heavier-than-water organic liquid for three days. The "Partially Reacted Water" is the result of reacting the free-product/water mix at up to 120° C. until all oxygen was consumed, stopping the reaction. The "Completely Reacted" test used the decanted, equilibrated water (no free product) with an excess of oxygen. The results of this test are shown as a function of time and temperature in FIG. 6. The completely reacted water (14 days at 100° C. followed by 6 days at 120° C.) shows no detectable trace of polycyclic aromatic hydrocarbon contaminants; at the detection limits of this measurement, that corresponds to at least 92% destruction. All compounds were destroyed, even notably difficult compounds to biodegrade such as benzo(a) pyrene. The "partially reacted" experiment which consumed all the oxygen, stopping the process in mid-reaction, no deleterious intermediate products were detected. Only hydroxylated forms of the original compounds were seen as intermediates. These disappear when the water is completely reacted. However, such intermediates have been discovered to be surfactants or surfactant precursors for use in the formation of oil/water emulsions described herein.

Figure 7:
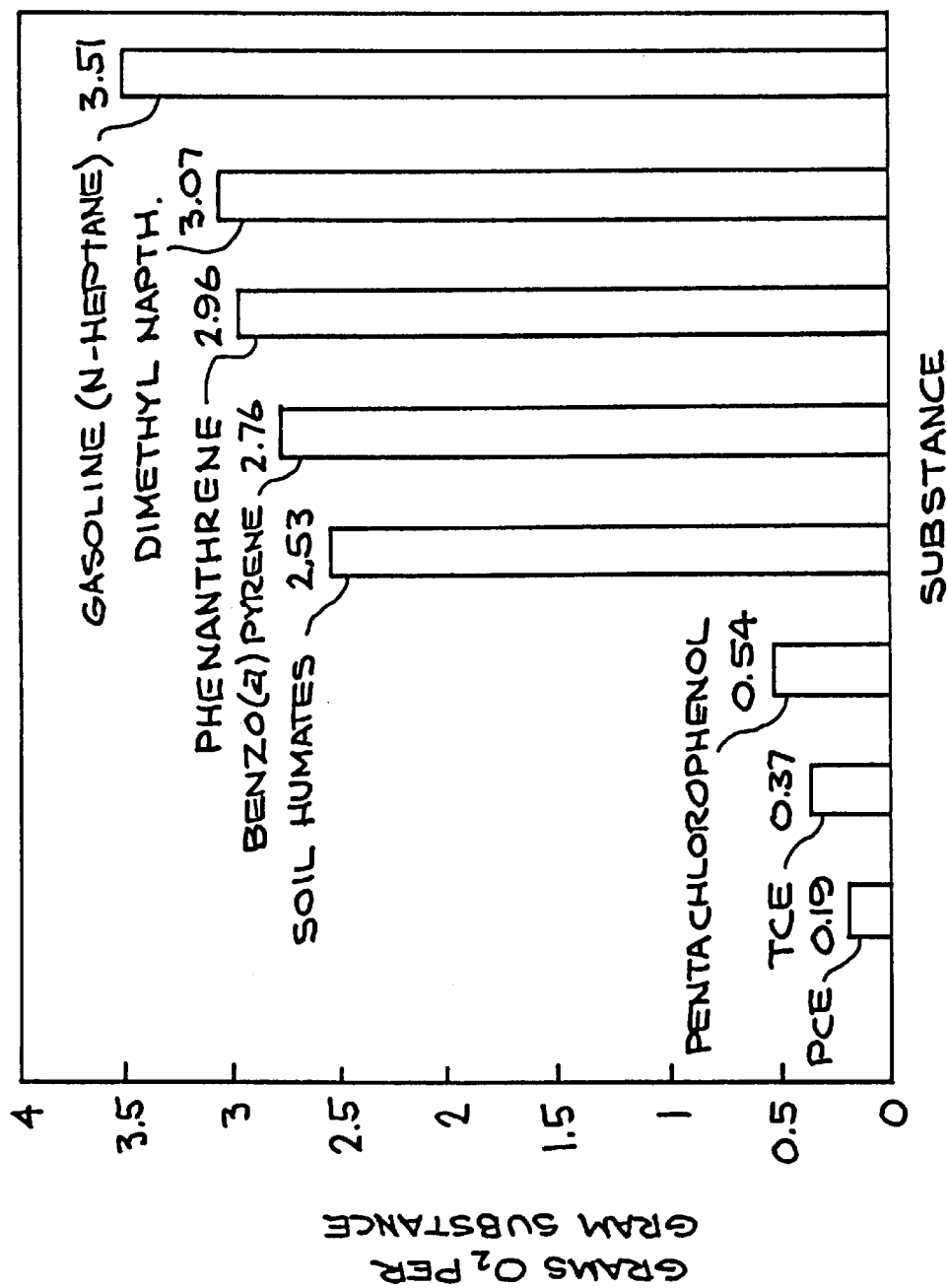
FIG. 7 shows the oxygen demand for the present process for several typical contaminant chemicals.

The amount of contaminant that can be destroyed by this process is determined by the oxygen demand for that compound, and the oxygen solubility in water at the reaction conditions. FIG. 7 shows the relative oxygen demand for several typical contaminants. Chlorinated compounds such as PCE require very little oxygen to be converted entirely to mineral components $H_2O$, $CO_2$, and $Cl^-$ ion. Only 0.19 grams of oxygen per gram of PCE are required. Alternatively for typical gasoline (represented by n-heptane) over 3.5 grams of oxygen are required per gram of contaminant. Furthermore, for typical creosote compounds (represented by dimethyl naphthalene) over 3.0 grams of oxygen are required per gram of contaminant. A typical, well-oxygenated ground water contains 4 parts per million of oxygen. Thus, in this typical ground water, without adding any oxygen, hydrous pyrolysis/oxidation could destroy over 20 ppm of PCE contaminant, but less than 1 ppm of gasoline. When more oxygen is required it must be added the steam or heating process, as described previously. In the HPO process the primary objective is to completely oxidize the organic in place which requires a stoichiometrically sufficient amount of dissolved oxygen (see FIG. 7). However, in the present invention involving only partial oxidation of the organics (contaminants) to surfactant precursors or surfactants, less oxygen (and preferably substantially less oxygen) is required per gram of organic than required for complete oxidation of such organics.

Figure 8:
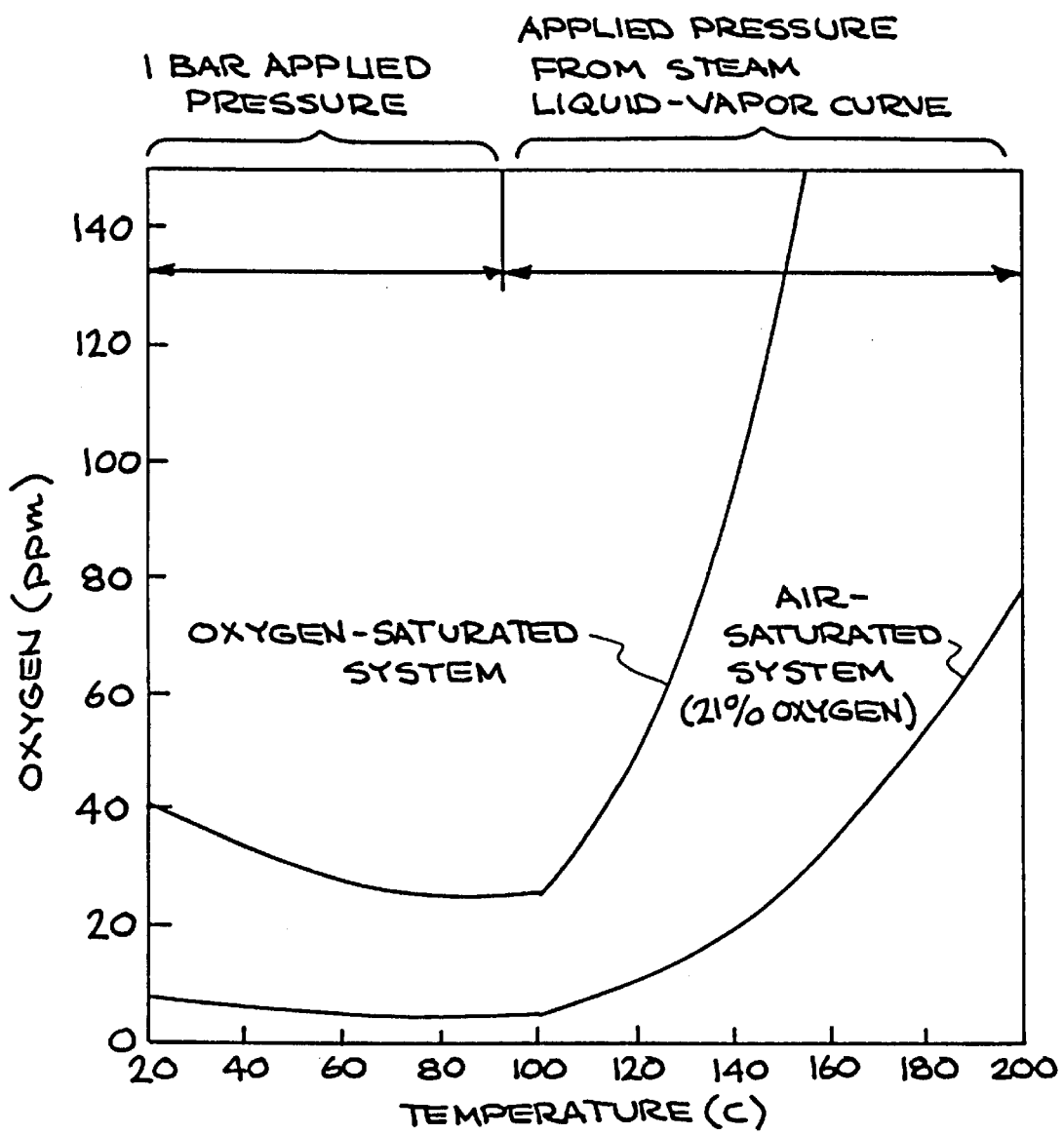
FIG. 8 shows the range of achievable oxygen concentrations in ground water when steam injection is used to maintain an applied overpressure.

FIG. 8 shows the amount of oxygen that can be achieved in water which is heated, and is thus in equilibrium with steam. Air-saturated water contains about ⅕ as much oxygen as that saturated with pure oxygen gas. As the temperature increases, the solubility of oxygen decreases slightly to a minimum at 100° C. of 25 ppm. Above that point, much more oxygen can be held in the water, because of the applied pressure from steam. In cases where the natural oxygen content of the ground water is insufficient, FIG. 8 shows the limits of how much oxygen can be obtained through addition of air or oxygen gas with steam. Because of the relatively small amount of oxygen present in the condensed steam, the oxidation of organic compounds is limited and surfactant production is encouraged. Multiple injections of oxygen-saturated steam may be made, sequentially oxidizing portions of the organics to form surfactants and precursors thereof.

The utility of the present invention stems from the finding that in situ hydrous pyrolysis/partial oxidation can remove harmful and toxic hydrocarbon contaminants from the subsurface soil, such as chlorinated hydrocarbons and fuel hydrocarbons, and remove the difficult-to-produce residual oil in reservoirs. The method is particularly useful as a follow-up to and complements other primary remediation and enhanced oil recovery techniques.

For example, following dynamic underground stripping remediation, there is an extended period of time during which the entire underground environment remains at temperatures significantly higher than ambient. During this time parts of the system cool down relatively quickly as a result of natural groundwater recharge, while other parts of the system cool much more slowly. These and other factors contribute to the fact that an unknown amount of each of the known hazardous and toxic contaminants, such as chlorinated hydrocarbons TCE, PCE, PCP or benzene, toluene, ethylbenzene and xylenes (BTEX), MTBE, or naphthalene that result from a fuel hydrocarbon spills, remain as residuals in the subsurface and potentially contaminate ground water. These residual toxic compounds are concentrated preferentially in regions poorly accessible to a steam flood, e.g. to regions of relatively low permeability, or they remain tightly adsorbed onto surfaces of various mineral phases, and moderate to low concentrations of the constrained organics remain behind as dissolved components in the groundwater phase. These residual contaminants and other similarly constrained organics are primary targets of the process of the invention.

The in situ hydrous pyrolysis/partial oxidation process of the invention provides several advantages over any other method previously employed. First, it is compatible with the temperatures produced during steam stripping or Joule heating and therefore offers a technology that is useful and can be applied to any site where steam or electrical heating is utilized or with other primary remediation techniques. Second, the invention does not require any special equipment other than the one used for DUS as long as the high temperatures is present and oxygen can be introduced. Third, the lifetime of the hydrous pyrolysis/partial oxidation process is extended over the period of time over which the soils and sediments remain at elevated temperatures. Fourth, optimal conditions for partial oxidation of organics can be easily induced or improved by introducing steam or using electrical heating to fine tune subsurface temperature regimes. Fifth, the overall rate of organic partial degradation may be set and controlled by addition of oxygen or air or oxidation catalysts. Sixth, the invention is practical, inexpensive, versatile and useful for enhanced oil recovery, a large-scale field remediation or for small industrial leaks or spills.

Changes and modifications in the specifically described embodiments can be carried out without departing from the scope of the invention which is intended to be limited only by the scope of the claims.

We claim:

1. A method for producing surfactants from accumulations of constrained organics at a subsurface site in a subsurface reservoir, said method comprising:

injecting steam and an oxidant into the subsurface site containing constrained organics to form a mixture containing predetermined portions of (a) condensed water from the stream and (b) the oxidant, water from the subsurface site and the constrained organics from the reservoir;

allowing hydrous pyrolysis/partial oxidation of the mixture to produce surfactants that form an oil/water emulsion with a second portion of the constrained organics and condensed water from the steam and/or water occurring naturally in the reservoir; and removing the oil/water emulsion from the subsurface reservoir.

2. The method of claim 1 wherein the oil/water emulsion comprises a lower surface tension than a removed second portion of the constrained organics containing no surfactants.

3. The method of claim 1 wherein the oxidant is selected from the group consisting of oxygen-containing fluid, oxygen gas, air, peroxide ions, and ozone.

4. The process of claim 1 wherein temperature conditions of the hydrous pyrolysis/partial oxidation of the mixture at the site are lower than that required to essentially degrade a majority of the organics in the reservoir.

5. A method for removing constrained organics from a subsurface reservoir, said method comprising:

elevating the temperature of the subsurface reservoir above the naturally occurring temperature of said reservoir, introducing steam into said reservoir, allowing at least a portion of said steam to condense in said reservoir, introducing an oxidant into said reservoir so as to contact water from condensed steam and/or water occurring naturally in the reservoir, producing surfactant precursors and/or surfactants at the site of the constrained organics contained in said reservoir, forming oil/water emulsions stabilized by said surfactant precursors and/or said surfactants, and removing said oil/water emulsions from said reservoir.

6. The method of claim 5 wherein the oxidant is selected from the group consisting of oxygen-containing fluid, oxygen gas, air, peroxide ions, and ozone.

7. The method of claim 5 wherein the oil/water emulsion comprises a lower surface tension than a removed second portion of the constrained organics containing no surfactants.

8. An enhanced oil recovery method comprising:

injecting steam and an oxidant into a subsurface reservoir containing constrained crude oil and liquid water;

producing surfactants by in situ hydrous pyrolysis/partial oxidation of a first portion of the crude oil;

forming an oil/water emulsion from the produced surfactants, the liquid water and a second portion of the crude oil; and removing the oil/water emulsion from the subsurface reservoir.

9. The method of claim 8 wherein at least a portion of said steam is allowed to condense in said reservoir prior to or during said producing of said surfactants.

10. The method of claim 8 further comprising steam flooding the underground reservoir prior to injecting steam and the oxidant into the reservoir.

11. The method of claim 8 wherein during said producing of said surfactants said reservoir has an elevated temperature relative to the normal temperature of the reservoir.

12. An environmental restoration method comprising:

injecting oxygen-containing gas and steam into subsurface soil containing constrained organic contaminants and condensate water;

producing surfactants by in situ hydrous pyrolysis/partial oxidation of the organic contaminants;

forming an oil/water emulsion from the produced surfactants, the condensate water and a second portion of the constrained organic contaminants; and removing the oil/water emulsion from the subsurface soil.

13. The method of claim 12 further comprising inducing underground stripping prior to injecting the oxygen-containing gas and steam.

14. A process for in situ hydrous pyrolysis/partial oxidation of chlorinated or fuel hydrocarbons or other volatile contaminants, comprising:

(a) inducing hydrous pyrolysis/partial oxidation at a site of contamination by introducing steam and oxygen under pressure to a site of contamination;

(b) optionally relieving the build-in pressure;

(c) allowing the hydrous pyrolysis/partial oxidation resulting in partial oxidation of a first portion of the contaminants to produce surfactants; and (d) removing from the site of contamination a contaminant/surfactant/water emulsion formed from mixing the produced surfactants with a second portion of the contaminants.

15. The process of claim 14 further comprising inducing hydrous pyrolysis/partial oxidation at a temperature between 75° C. and 200° C.

16. The process of claim 14 further comprising introducing a catalyst for partial oxidation of organics to the site.

17. The process of claim 16 wherein the catalyst is an oxidant selected from the group consisting of manganese dioxide and ferric oxide.

18. The process of claim 16 wherein the catalyst is present in the soil at the site naturally.

19. The process of claim 14 further comprising heating the ground by a method selected from the group consisting of direct electrical resistance heating, radio frequency, and microwave heating.

20. The process of claim 14 wherein the introduction of steam or oxygen is repeated multiple times.

21. The process of claim 14 wherein the contaminant is selected from the group consisting benzene, toluene, ethylbenzene, m-xylene, o-xylene, p-xylene, methyl tert-butyl ether, pentachlorophenol, phenol, 2-methylphenol, 4-methylphenol, 2,4-dimethylphenol, benzoic acid, napthalene, 2-methylnapthalene, acenaphthene, dibenzofuran, fluorene, phenanthrene, anthracene, fluoranthene, pyrene, benzo (a) anthracene, chrysene, benzo (b and k) fluoranthenes, benzo (a) pyrene, other hydrocarbons or chlorinated hydrocarbons, and mixtures thereof.

* * * * *